United States Patent [19]
Stephens et al.

[11] Patent Number: 5,275,536
[45] Date of Patent: Jan. 4, 1994

[54] POSITIONING SYSTEM AND IMPACT INDICATOR FOR GAS TURBINE ENGINE FAN BLADES

[75] Inventors: Paul S. Stephens, Sharonville; Stephen J. Szpunar, West Chester, both of Ohio

[73] Assignee: General Electric Company, Cincinnati, Ohio

[21] Appl. No.: 873,321

[22] Filed: Apr. 24, 1992

[51] Int. Cl.⁵ .................................. F01D 5/22
[52] U.S. Cl. ...................... 416/248; 416/193 A; 416/500
[58] Field of Search ........................ 416/248, 219

[56] References Cited

U.S. PATENT DOCUMENTS

| | | | |
|---|---|---|---|
| 2,317,338 | 4/1943 | Rydmark | 416/500 |
| 3,037,741 | 6/1962 | Tuft | 416/500 |
| 3,784,320 | 1/1974 | Rossmann et al. | 416/219 R |
| 3,936,234 | 2/1976 | Tucker et al. | 416/220 R |
| 4,019,832 | 4/1977 | Salemme et al. | 416/248 |
| 4,451,204 | 5/1984 | Pask | 416/248 |
| 4,645,425 | 2/1987 | Morrison, Jr. | 416/219 R |
| 4,919,574 | 4/1990 | Dodd et al. | 416/500 |
| 4,940,389 | 7/1990 | Luxenburger | 416/220 |
| 5,022,824 | 6/1991 | Violette et al. | 416/248 |
| 5,123,813 | 6/1992 | Przytulski et al. | 416/219 R |

FOREIGN PATENT DOCUMENTS

| | | | |
|---|---|---|---|
| 1025421 | 3/1958 | Fed. Rep. of Germany | 416/219 |
| 148600 | 10/1948 | Sweden | 416/500 |

Primary Examiner—John T. Kwon
Attorney, Agent, or Firm—Jerome C. Squillaro

[57] ABSTRACT

A fan blade and rotor disk assembly for a gas turbine engine has a projection attached to a shank region of a fan blade. The projection makes contact with a surface region of a disk post when the fan blade is assembled to the rotor disk. In one form, a spring urges the fan blade to a position to maintain the projection in contact with the disk post surface so as to maintain the radial position of the fan blade. The projection member absorbs impact loading, shears off, allowing the blade to rotate and reduces the moment experienced by the root region of the fan blade when the fan blade is impacted by a foreign object.

14 Claims, 3 Drawing Sheets

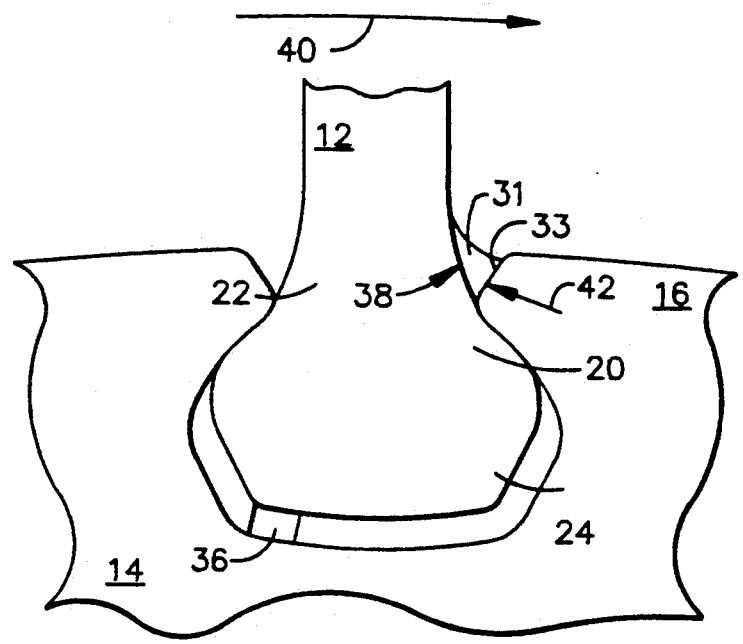
FIG. 5
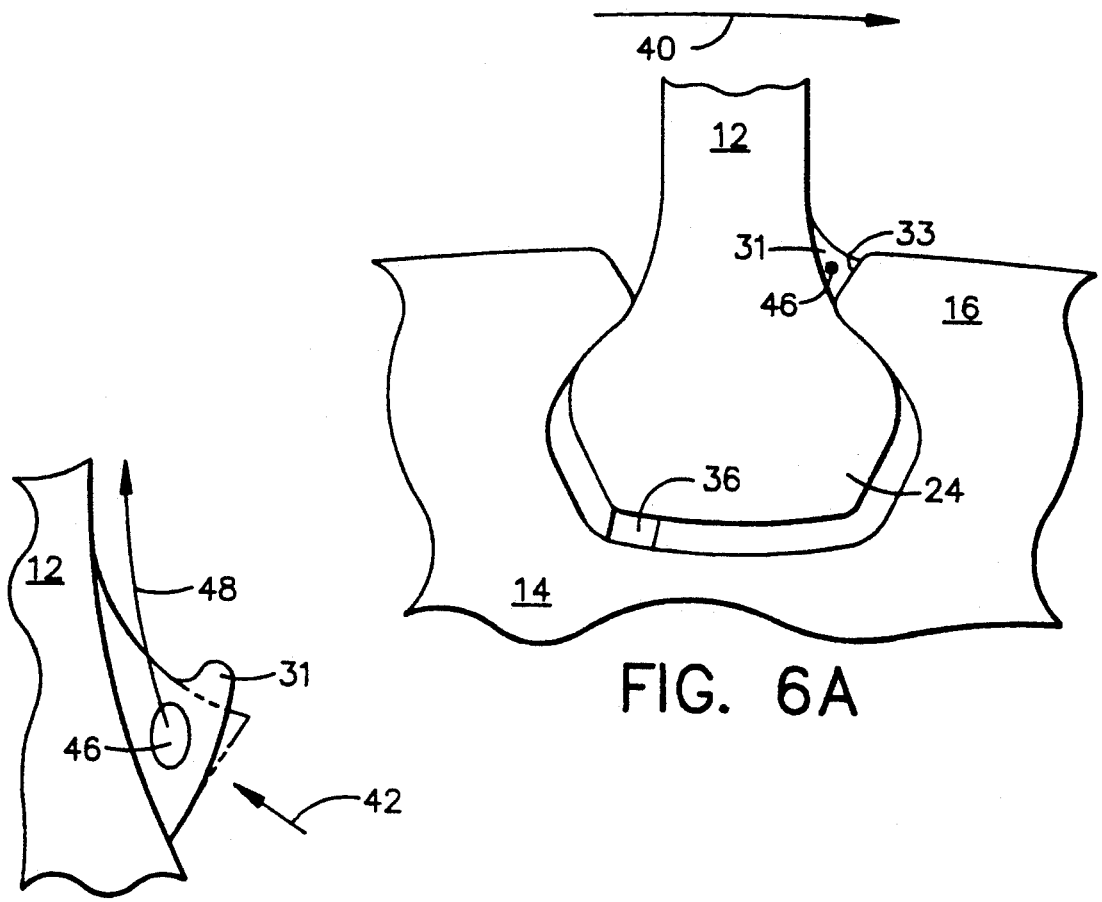
FIG. 6A
FIG. 6B

POSITIONING SYSTEM AND IMPACT INDICATOR FOR GAS TURBINE ENGINE FAN BLADES

BACKGROUND OF THE INVENTION

The present invention relates to fan blades for gas turbine engines and, more particularly, to an apparatus and method for maintaining a fan blade in a desired radial orientation and providing added protection to the structural integrity of the root region of a fan blade when the fan blade collides with a foreign object.

In the past, aircraft gas turbine engine composite fan blades with cylindrical pressure faces have not been designed to stay in a fixed radial orientation. A cylindrical-pressure-face connection of a fan blade with a rotor disk is very similar to a ball-joint connection. Typically, the root and dovetail regions of the fan blade fit into an accommodating cavity of a rotor disk and are given such a degree of freedom that their radial orientation is not constantly maintained. The radial orientation of such fan blades differs depending on whether the engine is idling, windmilling, or under full power. Once rotation of the fan blades begins, friction in the dovetail regions of the fan blades tends to seat the blades at a position that the blade stacking axis may be off center or misaligned from a desired blade radial position. It is desirable that the blade stacking axis remain a constant from blade to blade so that fan rotor balance does not change with each operation for purposes of preventing unacceptable vibrations.

Another problem encountered by fan blades in aircraft gas turbine engines is the ingestion of foreign objects into the air inlet at the front of the nacelle and collision of such objects with the fan blades. These foreign objects often manifest themselves as birds or runway debris which are sucked into the fan blades. It is desirable that the damage to a fan blade struck by a foreign object be confined to the immediate area of impact, typically the airfoil region of the fan blade. If impact with a foreign object causes the root region of the fan blade to be separated from its connection to the rotor disk, serious damage can be done to the engine.

In an exemplary engine, each fan blade may only weigh approximately 30 pounds. However, when the blades are spinning, each blade can have as much as 200,000 pounds of load applied to the disk-root interface. Therefore, the importance of keeping the root region of the blade intact with the rotor disk can be clearly appreciated.

Thus, a need exists for a fan blade and disk assembly which will allow a fan blade to maintain a desired radial position during start up and running. Also, it is desirable to reduce the bending moment at the root of the fan blade when the fan blade is struck by a foreign object.

SUMMARY OF THE INVENTION

The present invention relates to a fan blade and disk assembly which maintains a fan blade at a desired radial position and which is designed to reduce the moment experienced by the root region of the blade when the blade is impacted by a foreign object. The fan disk assembly of the present invention includes a fan blade having a dovetail region which is fitably secured in a cavity of a rotor disk. Projection means attached to a shank region of the fan blade maintains the fan blade in proper radial alignment. A disk post integrally connected to the rotor disk has a chamfered surface for contacting the projection means so that the fan blade is maintained in proper radial alignment. In one embodiment, fan blade orientation is assisted by spring biasing the projection means into contact with the chamfered surface of the disk post. In another embodiment, the project means incorporates a dye pocket which can be crushed when an impact places a predetermined stress on the fan blade whereby dye is caused to flow over the blade to provide visual indication of such impact.

BRIEF DESCRIPTION OF THE DRAWINGS

A more complete appreciation of the invention and many of the attendant advantages thereof will be readily obtained as the same becomes better understood by reference to the following detailed description when considered in connection with accompanying drawings, wherein:

FIG. 5 is a schematic axial view of a fan blade and disk assembly according to a third embodiment of the present invention in which a projection is attached to a shank region of the fan blade at an adhesive bond area, the adhesive bond area sheering at a predetermined load level;

FIG. 6A is a schematic axial view of a fan blade and disk assembly according to a fourth embodiment of the present invention in which a projection attached to a shank region of the fan blade is provided with a liquid-dye-filled cavity; and FIG. 6B is a closeup schematic illustration of the ink filled cavity of FIG. 6A while being subjected to an impact reaction.

When referring to the drawings, it should be understood that like referenced numerals designate identical or corresponding parts throughout the respective figures.

THE DETAILED DESCRIPTION OF THE INVENTION

Figure 1:
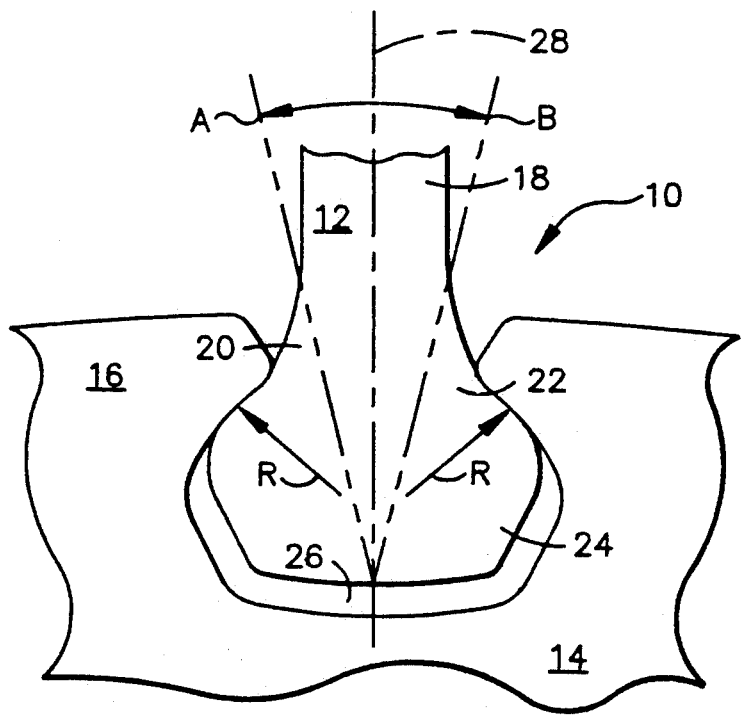
FIG. 1 is a schematic axial view of a prior art fan blade and disk assembly which visualizes the blade stacking axis of the fan blade and the freedom of the fan blade to rotate and seat at a wide range of angular positions.

In FIG. 1, a prior art fan blade and disk assembly 10 is comprised of a fan blade 12 and a fan rotor disk 14. Fan blade 12 is comprised of air foil region 18, shank region 20, root region 22 and dovetail region 24. Air foil region 18 has been truncated but may assume any of the various configurations used in a selected engine. Furthermore, while a gas turbine engine has not been shown, references may be made to U.S. Pat. No. 4,132,069 for details of an exemplary engine. The root region 22 connects to dovetail region 24 and dovetail region 24 fits into a slot or cavity 26 of disk 14. The disk posts 16 extending from disk 14 restrict circumferential and radial movement of fan blade 12 and defines slot 26. The connection of fan blade 12 to disk 14 can be thought of as a hinged or cylinder-sleeve connection similar to a ball and socket joint. Arrows denoted by R indicate the radiused pressure faces of dovetail region 24. Frictional contact occurs between these radiused pressure faces of dovetail region 24 and the abutting inner surfaces of rotor disk 14 which define cavity or slot 26. The radiused pressure faces indicated at R are formed with radiused or convex surfaces at the interface or contact region with the inner surfaces of cavity 26 to allow the blade 12 to pivot about an engine radius line, coinciding with line 28, when the blade is impacted by a foreign object. However, a radiused pressure face creates a problem in that it is difficult to maintain the blade in a desired radial position aligned with the radius line 28. The line 28 corresponds to a blade stacking axis and represents a desired angular position of the blade 12 with respect to an engine radius i.e., an angular position in a plane normal to the axis of rotation of rotor disk 14. The manner in which the dovetail region 24 is secured to the disk 14 allows the fan blade 12 to rotate and seat at a wide range of angular positions which are indicated as including the range from line A to line B.

Figure 2:
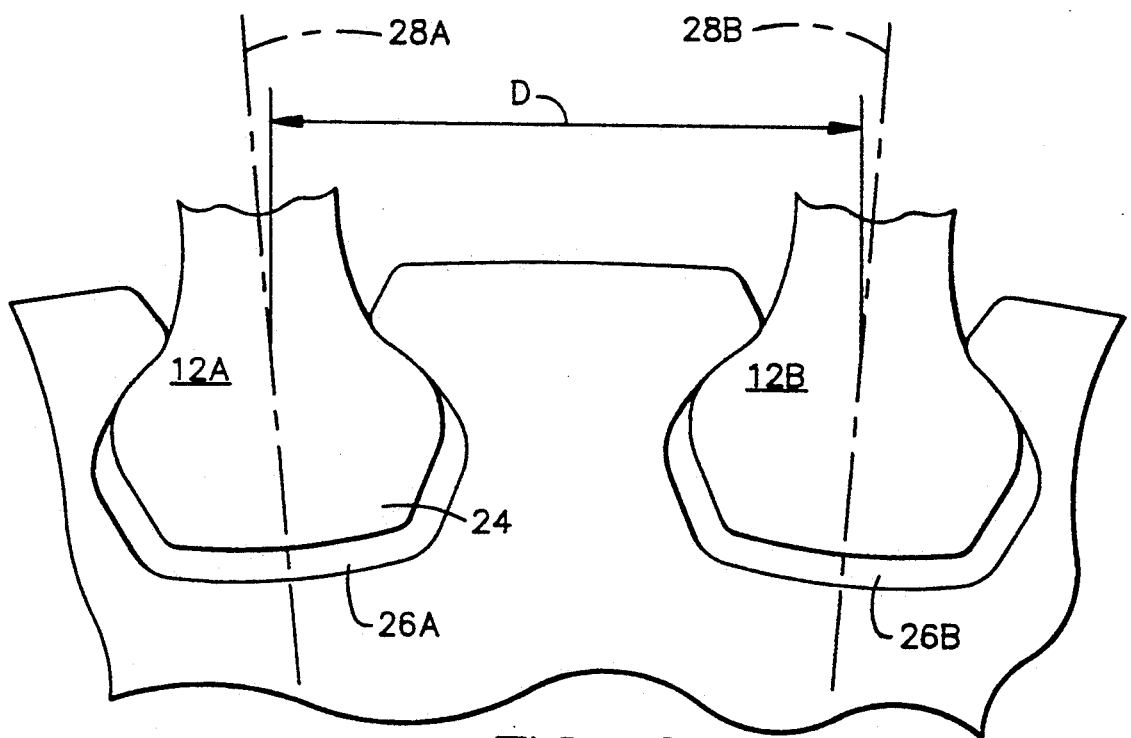
FIG. 2 is an exemplary schematic axial view of two adjacent fan blades with their stacking axis fully aligned with the desired radial position and their respective blade stacking axes being separated by a distance D.

In FIG. 2, two adjacent blades 12A and 12B are shown positioned in corresponding slots 26A and 26B in rotor disk 14 with fan blade 12A having a blade stacking axis 28A and fan blade 12B having a blade stacking axis 28B. A given point on blade stacking axis 28A and a given point on blade stacking axis 28B are separated by a distance D. The lines represented by blade stacking axes 28A and 28B (FIG. 3) lie on engine rotor radius lines and are not parallel but extend through the rotor centerline or axis of rotation (not shown). However, as FIG. 1 demonstrates, if the fan blades are allowed the freedom to move to a wide range of angular positions from A to B, a uniform distance D between the given points on the engine fan blades will not be maintained and engine efficiency and balance will be detrimentally affected.

Figure 3:
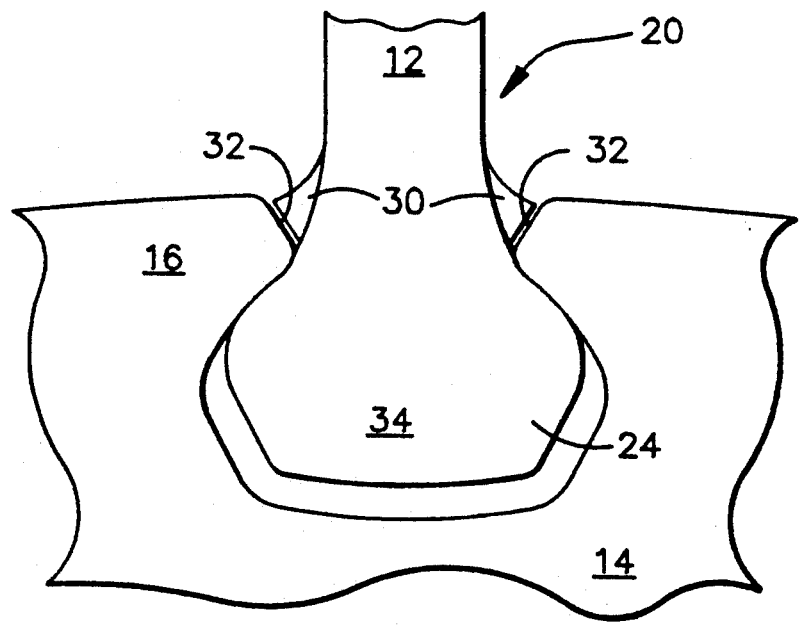
FIG. 3 is a schematic axial view of a fan blade and disk assembly according to one embodiment of the present invention which demonstrates projections which are attached to the shank regions of the fan blade adjacent to the disk post of the rotor disk, the projections contacting a flat surface of the disk post.

In FIG. 3, fan blade 12, according to a first embodiment of the present invention, is provided with projection means 30 which are attached to both sides of blade shank region 20 either by adhesive or by forming integrally with blade 12. The radially outer corners 32 of each disk post 16 are formed or machined with chamfered surfaces specifically adapted for mating with a radially inner surface of the projections 30. The surfaces at 32 may be flat or assume some other desired shape. Pivoting of the blade with respect to the radial position is restricted by interaction between projection means ("projections") 30 and surfaces 32 which thus provide a locating and position maintaining feature for the fan blade 12. To allow for the assembly of the fan blade 12 into the disk 14, a small clearance gap is provided between projections 30 and the flat surfaces 32. Such gaps may allow a small amount of blade rotation to occur and, although much less than the degree of rotation allowed by the arrangement of FIG. 1, such small rotation may still be undesirable in some engine systems. As is well known, the rotor disk 14 is an annular disk having a plurality of circumferentially spaced slots 26 for receiving a corresponding plurality of fan blades 12. While only one such slot and blade arrangement is shown, it is to be understood that each blade/slot arrangement is identical.

Figure 4:
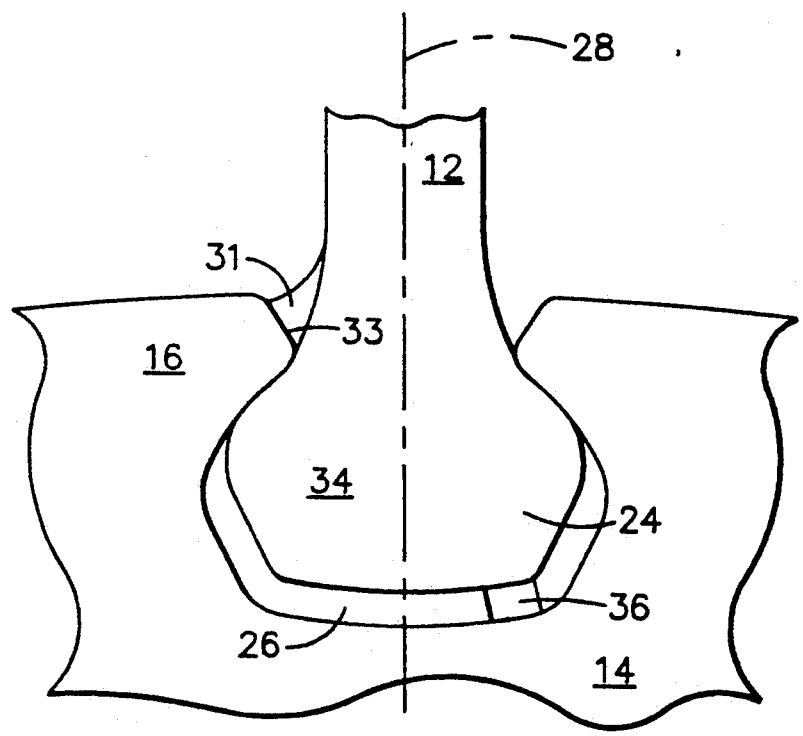
FIG. 4 is a schematic axial view of a fan blade and disk assembly according to a second embodiment of the present invention in which a spring biases a projection attached to a shank region of the fan blade against a flat surface of a disk post connected to the rotor disk.

FIG. 4 illustrates a second embodiment of the present invention which improves positioning of a blade with respect to the stacking axis 28 while providing some ability to accommodate some foreign object impacts. An off-center spring 36 is located in cavity or slot 26 between disk 14 and a radially inward surface of dovetail region 24 of fan blade 12. Spring 36 may comprise an elastomeric material, such as silicone rubber, a composite material, a metallic spring, or other appropriate material. The spring 36 biases blade 12 toward a counterclockwise rotation. A single projection 31, corresponding to one of the projections 30, is forced into contact with a mating surface 33, corresponding to one of the surfaces 32, formed on disk post 16. The spring 36 is selected to provide sufficient force to maintain contact between projection 31 and surface 33 during normal engine operation. However, the elastomeric characteristic allows the blade 12 to absorb and accommodate some degree of rotation caused by foreign object impact.

FIG. 5 illustrates an alternative assembly in which blade 12 is provided with single projection 31 attached to shank region 20 by an adhesive bond at area 38. Single projection 31 is placed in frictional contact with flat surface 33 of disk post 16 by the spring 36. Should the blade 12 be struck by a foreign object, the blade would rotate as indicated by arrow 40 and an impact load reaction 42 would be applied against single projection 31. The adhesive bond area is designed to shear off if subjected to a predetermined amount of shearing force. When the fan blade 12 is impacted by a foreign object, the shearing away feature of bond area 38 reduces the moment experienced by the root region 22 and dovetail region 24 of the fan blade. As a result of the adhesive bond area 38, the single projection 31 will shear off at a much lower load than the load required to damage the blade root 22. Thus, the likelihood of the root region being uprooted from the rotor disk is greatly reduced and safety increased.

The fan blade and disk assembly of the present invention mitigates the possibility of a blade breaking off at the root. Should a blade break off at the root the possibility of secondary damage occurring to other blades is increased. Therefore, the present invention increases the likelihood that any debris from an impacted blade will be easily contained and that the structural integrity of engine mounts and bearings will be able to withstand the resulting imbalance.

In FIG. 6A, the single projection 31 is provided with a dye-filled pocket or cavity 46 with the single projection 31 making frictional contact with the flat surface 33 of disk post 16. Should the blade be impacted such that the blade rotates as indicated by arrow 40, an impact load reaction from the flat surface 33 will react upon the single projection 31. If the reaction is of a sufficient magnitude, the single projection 31 will be crushed and the dye in cavity 46 will be released. FIG. 6B is an enlarged schematic representation of the projection 31 and demonstrates how ink flow 48 from ink cavity 46 will disseminate when an impact reaction 42 is of sufficient force to crush projection 31. The dye thus released will flow outward along the airfoil as a result of centrifugal forces acting upon the dye.

Thus, the fact that dye is on a fan blade air foil will indicate to a maintenance person that the blade has undergone at least a predetermined level of stress and strain. Of course, such a marking system is not needed in instances where an impact removes portions of the airfoil. However, in those instances where the impact is not sufficient to do obvious structural damage, the present invention demonstrates a marked improvement in maintenance safety for composite blades. While metal blades when struck will often show evidence such as a dimpling or bulge in the surface of the airfoil as a result of small object impact, composite fan blades have an elastic-like characteristic such that dimples or bulges tend to disappear. Thus, the dye-identifying system is a valuable means to indicate that an impact of a predetermined magnitude has occurred.

Also, since the present invention provides a means to maintain fan blades in a constant radial position, the blades can be installed and trim balanced without the need to continually trim balance the blades. The trim balancing of fan blades is somewhat analogous to balancing the tires of an automobile. Fan blades are trim balanced by using an accelerometer to identify the phase and amount of imbalance. Weights are then placed at appropriate locations of the spinner to achieve a desired balancing of the fan blades. By stabilizing the orientation of the fan blades along their respective stacking axis, absent damage to a blade, the fan assembly tends to remain in balance.

The present invention has been demonstrated to be applicable to composite fan blades, but the teachings of the present invention can be applied to any blade which requires a radiused or cylindrical dovetail contact surface.

The foregoing detailed description and preferred embodiments of the invention are intended to be illustrative and non-limiting. Many changes and modifications are possible in light of the above teachings. Thus, it is understood that the invention may be practiced otherwise than as specifically described herein and still be within the scope of the appended claims.

What is claimed is:

1. A fan blade and disk assembly, comprising:
   a fan blade having a dovetail region and a shank region;
   a rotor disk having a slot defined by an adjacent pair of radially extending disk posts for receiving said dovetail region of said fan blade;
   projection means attached to said shank region of said fan blade for maintaining said fan blade for maintaining said fan blade in a desired radial position, said projection means incorporating a pocket of dye therein, a predetermined impact load on said projection means being effective to release said dye; and
   a surface formed on at least one of said disk posts for mating engagement with said projection means for limiting rotation of said fan blade stacking axis.

2. An assembly according to claim 1, further comprising:
   resilient biasing means axially offset from a stacking axis of said fan blade of urging said fan blade in a preselected angular direction for establishing engagement between said at least one projection means and said disk post surface and for absorbing limited elastic rotation in a direction away from said one side of said shank region.

3. An assembly according to claim 2, wherein:
   said biasing means comprises a spring member positioned in said slot between said rotor disk and said dovetail region of said fan blade.

4. An assembly according to claim 1, wherein:
   said projection means is adhesively bonded to said shank region of said fan blade.

5. An assembly according to claim 4, wherein said projection means will shear from said shank region at a predetermined load level.

6. A fan blade and disk assembly, comprising:
   a fan blade having a dovetail region and a shank region;
   a rotor disk having a slot defined by an adjacent pair of radially extending disk posts for receiving said dovetail region of said fan blade;
   projection means attached to only one side of said shank region of said fan blade;
   a surface formed on one of said disk posts for mating engagement with said projection means for preventing circumferential rotation of said fan blade in a direction toward said one side of said shank region; and
   resilient biasing means axially offset from a stacking axis of said blade for urging said fan blade in a preselected angular direction for establishing engagement between said at least one projection means and said disk post surface and for absorbing limited elastic rotation in a direction away from said one side of said shank region.

7. An assembly according to claim 6, wherein:
   said biasing means comprises a spring member positioned in said slot between said rotor disk and said dovetail region of said fan blade.

8. An assembly according to claim 6, wherein:
   said projection means is adhesively bonded to said shank region of said fan blade.

9. An assembly according to claim 6, wherein said projection means will shear from said shank region at a predetermined load level less than a failure load level of said blade.

10. An assembly according to claim 6, wherein said projection means incorporates a pocket of dye therein and wherein a predetermined impact load on said projection means is effective to release said dye.

11. A fan blade and disk assembly, comprising:
    a fan blade having a dovetail region and a shank region;
    a rotor disk having a slot defined by an adjacent pair of radially extending disk posts for receiving said dovetail region of said fan blade;
    destructible projection means attached to each circumferential side of said shank region of said fan blade;
    a pair of surfaces formed on said disk posts in positions for engagement with respective ones of said projection means, said projection means being spaced radially from said surfaces when a stacking axis of said fan blade is generally aligned with a radius line of said rotor disk, one of said projection means contacting a respective one of said surfaces only when said fan blade rotates circumferentially about an axis passing through said dovetail region such that said stacking axis is angularly displaced from said rotor disk radius line by a preselected magnitude.

12. The assembly of claim 11 and including resilient biasing means positioned in said slot for urging said fan blade radially outward from said disk port for maintaining said spaced relationship between said projection mean and said disk post surfaces.

13. An assembly according to claim 12, wherein:
    said projection means is adhesively bonded to said shank region of said fan blade.

14. An assembly according to claim 12, wherein:
    said projection means will shear from said shank region at a predetermined load level less than a failure load level of said blade.

* * * * *